Figure 1:
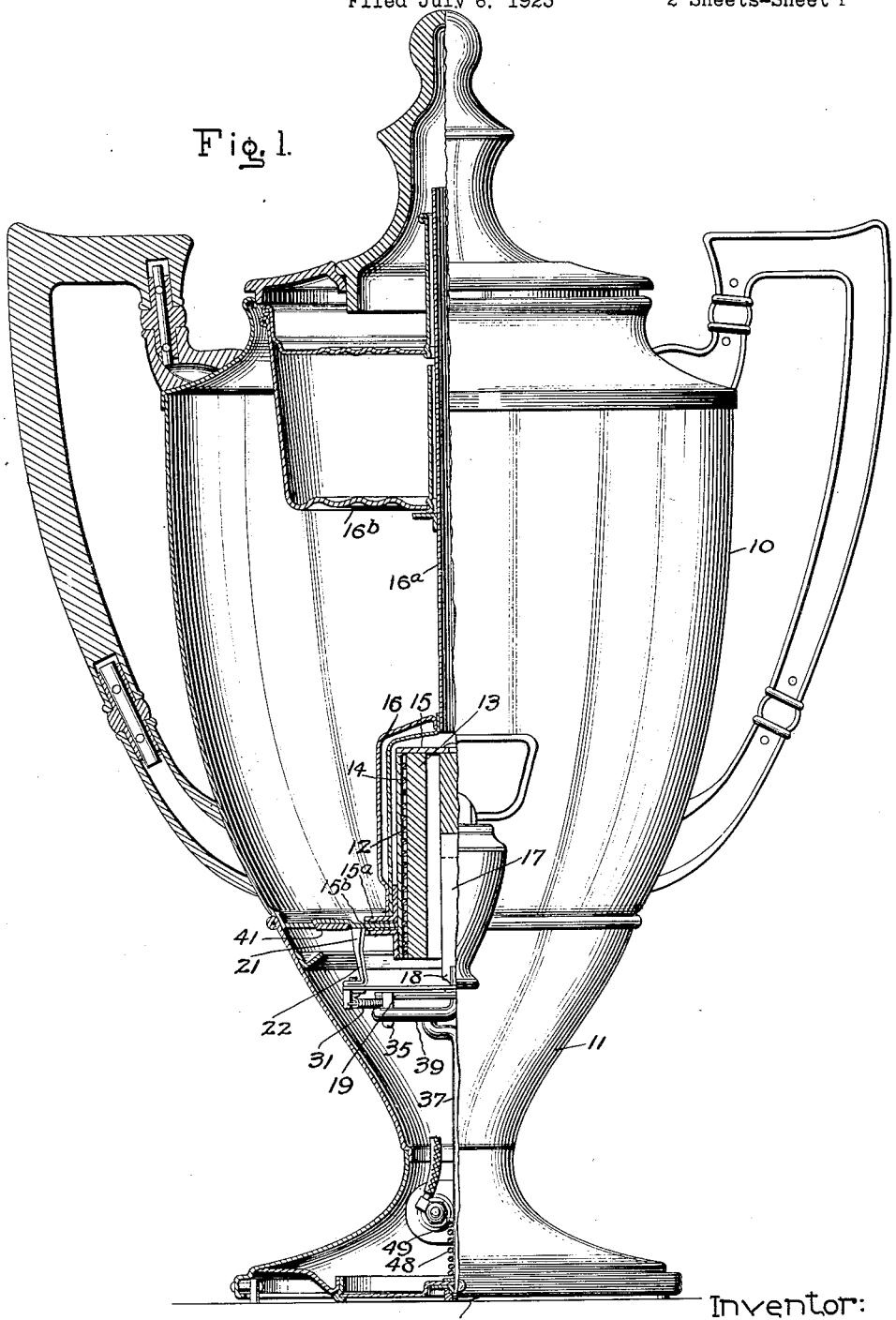

March 8, 1927.　　　　A. H. SIMMONS　　　　1,620,495

ELECTRIC URN

Filed July 6, 1923　　　　2 Sheets-Sheet 1

Inventor:
Albert H. Simmons,
by His Attorney.

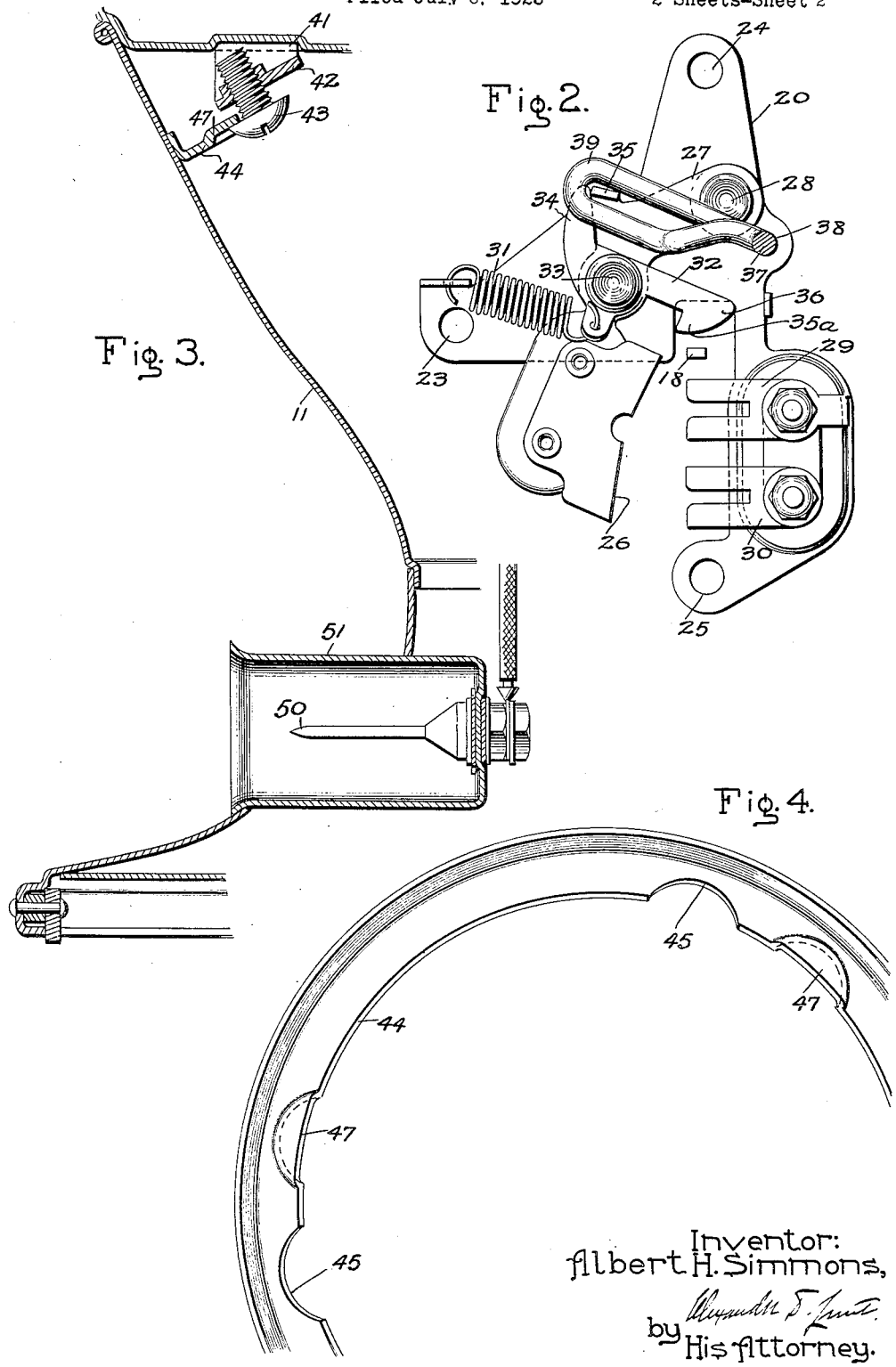

Patented Mar. 8, 1927.

1,620,495

UNITED STATES PATENT OFFICE.

ALBERT H. SIMMONS, OF OAK PARK, ILLINOIS, ASSIGNOR TO EDISON ELECTRIC APPLIANCE COMPANY, INC., OF CHICAGO, ILLINOIS, A CORPORATION OF NEW YORK.

ELECTRIC URN.

Application filed July 6, 1923. Serial No. 649,777.

My invention relates to electric urns, more particularly to electric percolators provided with an automatic temperature cutout, and has for its object a simplified construction and arrangement of parts whereby the appearance of the percolator may be improved. By means of my invention I am enabled to construct a percolator having the form of a narrow pedestal urn.

For a more complete understanding of my invention reference should be had to the accompanying drawing in which Fig. 1 is an elevation view partially in section of an electric percolator embodying my invention; Fig. 2 is a view looking upward of the switching mechanism; Fig. 3 is a fragmentary enlarged view in section showing the clamping means for securing the parts of the percolator body together; while Fig. 4 is a detail view of the clamping means.

Referring to the drawing, in one form of my invention the percolator body is divided into two parts, an upper vessel part 10 comprising a container for the coffee and on which the electric heating means and circuit controlling means are mounted, and a lower base part 11 which forms with the upper part 10 a narrow pedestal urn. The electric resistance heating device 12 is cylindrical in shape and mounted in an aperture in the bottom of the vessel 10. It comprises a tubular support 13 made of a suitable insulating material, such as lava, on which a resistance heating conductor 14 is wound, and a casing 15 enclosing the resistance conductor and support. The heating device is secured to the vessel by means of two flanges 15$^a$ and 15$^b$ between which the wall of the vessel is tightly clamped, the lower flange 15$^b$ screwing on the end of the casing. Preferably asbestos gaskets are provided between the flanges and the vessel wall. Surrounding the heating device is a suitable pump 16 having a tube 16$^a$ which extends upward into the coffee container 16$^b$ in a well-known manner. Secured at its upper end to the metallic casing 15 of the heating device is a thermostat 17, the lower end 18 of which cooperates with the circuit controlling device 19. The thermostat is of a common form comprising two metals having different coefficients of expansion whereby the lower end is given lateral movement in response to changes in temperature.

Referring to Fig. 2 the circuit controlling device comprises a supporting plate or member 20 which is secured in a horizontal position to the bottom of the vessel 10 in spaced relation therewith by means of a supporting member 21 (Fig. 1) having three downwardly projecting lugs 22, only one of which is shown, to which the plate 20 is secured by suitable bolts or screws passing through holes 23, 24 and 25 in the plate. A movable switch blade 26 is carried on the end of a switch arm 27 pivoted to the supporting member 20 at 28. This switch blade cooperates when in closed position with two stationary blades 29 and 30 secured to the supporting member 20 in insulated relation therewith and in insulating relation with each other, thus closing the heating circuit for the heating device 12. The switch arm 27 is biased to the open circuit position shown in Fig. 2 by means of a spiral spring 31 secured at one end to the supporting member 20 and having its other end secured to a latch 32 pivoted at a point 33 on the switch arm 27. This latch is provided at one end with an extension 34 which engages with a projection or down turned lug 35 on the switch arm so as to limit the movement of the latch about its pivot when the switch opens in response to the pull applied by spring 31. The opposite end of latch 32 is provided with a latching shoulder 35$^a$ which normally engages with the lower end 18 of the thermostat whereby the switch arm is latched in closed position. In the operation of the circuit controlling device, in case the percolator reaches an excessively high temperature, for example, if it should boil dry, the lower end of the thermostat 18 moves laterally, which movement as viewed in Fig. 2 would be toward the bottom of the figure, to a position substantially that shown in Fig. 2, thus moving off of shoulder 35$^a$ of the latching member and permitting the switch to open. As the percolator now cools, the thermostat will move in the opposite direction back to its original position into engagement with the beveled end 36 of the latching member, whereby when the switch arm is moved to closed position the end of the thermostat will again engage with the shoulder 35$^a$ and hold it in this position. As the switch arm is moved to closed position after the cooling of the percolator, it will be observed that the latch 32 will be moved slightly about its pivot due to the engagement of its beveled end 36 with the thermostat until shoulder 35ª snaps behind the thermostat.

In order to provide for closing the cutout switch from the exterior of the percolator in case it is opened by the occurrence of excessively high temperatures, an upright shaft 37 is provided extending centrally of the base portion 11 of the percolator body with its lower end rotatably supported in the base of the percolator and its upper end passing through an aperture 38 in supporting member 20. This shaft is provided with a lateral extension or loop 39 which surrounds lug 35. Secured to the lower end of shaft 37 and exterior of the base of the percolator is a lever arm 40 by means of which the shaft may be turned, whereby due to the cooperation of loop 39 with lug 35 the switch arm may be moved to closed circuit position. Due to the fact that the switch arm and the shaft move about different centers, it will be observed that lug 35 will have a slight movement in the loop 39.

The two portions 10 and 11 of the urn are adapted to fit each other without affecting the appearance of the urn, for example, the upper edge of the portion 11 is shown rolled and adapted to fit over a narrow restricted portion on the lower end of portion 10, providing a telescopic connection, although this is not necessary. To provide for securing the two portions together, a ring member 41 is secured to the bottom of vessel 10 on the exterior thereof. This ring is provided with depressed portions 42 at intervals, which are threaded to take a clamping screw 43 the head of which engages with a ring or flange 44 secured on the interior of the base portion 11. Any number of clamping screws may be used as required although in the construction shown provision is made for three screws. Spaced notches 45 corresponding in position and number with the screws 43 are preferably provided in the flange 44 whereby the screws 43 may be started in the ring 42 after which in assembling the two portions 10 and 11, the portion 11 may be put in position by so disposing it that the heads of the screws pass through the notches 45 after which the portion 11 may be rotated slightly with relation to portion 10 so that the heads of the screws register with depressions 47 in flange 44 provided for them. After thus assembling the parts the two may be securely clamped together by tightening screws 43 on the flange 44. It will be observed that the base portion 11 serves also to enclose and thereby conceal the temperature cut-out mechanism and the means for securing the base portion to the vessel 10.

A spiral spring 48 is provided for holding the shaft 37 in position. This spring cooperates with the base of the percolator and a flange 49 on the shaft, thus holding the loop 39 in engagement with the lug 35.

The terminals of the heating circuit are connected to suitable terminal pins 50 positioned in a plug guard 51 adjacent the bottom of the percolator whereby the percolator may be connected to a heating circuit by means of a suitable plug connector.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination in an electrically heated urn, of a vessel forming the upper part of said urn, electric heating means for said vessel, a hollow base member forming the lower part of said urn, a telescopic connection between said vessel and said base member, and means enclosed by said base member for securing said base member to said vessel.

2. The combination in an electrically heated urn, of a vessel forming the upper part of said urn, electric heating means secured to said vessel, a temperature cut-out for said heating means mounted on the bottom of said vessel, a hollow base member enclosing said cut-out forming the lower part of said urn, and means enclosed by said base member for detachably securing said base member to said vessel.

3. The combination in an electrically heated urn, of a vessel forming the upper part of said urn, an electric heater secured to the bottom of said vessel, a temperature cut-out for said heating means secured to the bottom of said vessel, a hollow narrow pedestal base member enclosing said cut-out forming the lower part of said urn, the opening through said base member being too small to allow the installation of the heater and cut-out mechanism therethrough, and means enclosed by said base member for detachably securing said base member to said vessel.

4. An electric percolator comprising a vessel, an electric heater for said vessel, means for securing said heater, a base for said vessel, a telescopic joint between said vessel and said base, internal projecting means on said base, and clamping means carried by said vessel cooperating with said projecting means to secure said base.

5. An electric percolator comprising a vessel, electric heating means for said vessel, a base for said vessel, a telescopic joint between said vessel and said base, an internal flange on said base, and clamping screws carried by said vessel cooperating with said flange to secure said base.

6. An electric percolator comprising a vessel, electric heating means for said vessel, a base for said vessel, an internal flange on said base, a clamping ring secured to said vessel, and clamping screws cooperating with said ring and said flange to secure said base.

7. An electric percolator comprising a vessel, electric heating means for said vessel, a temperature responsive cut-out for said heating means, reset means for said cutout, a hollow base arranged to fit on said vessel so as to enclose said reset means, and means enclosed by said base and accessible therethrough for securing said base to said vessel.

8. An electric percolator comprising a vessel, electric heating means for said vessel, a temperature responsive cutout for said heating means, a reset device for said cutout, a hollow base for said vessel enclosing said reset device, a flange on the interior of said base, and clamping screws carried by said vessel cooperating with said flange to secure said base to said vessel, said screws being accessible through said base.

In witness whereof, I have hereunto set my hand this 28th day of June, 1923.

ALBERT H. SIMMONS.